(12) United States Patent
Nakata

(10) Patent No.: US 8,151,340 B2
(45) Date of Patent: Apr. 3, 2012

(54) DATA RELAY DEVICE AND DATA RELAY METHOD

(75) Inventor: Tomohito Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 612 days.

(21) Appl. No.: 12/230,536

(22) Filed: Aug. 29, 2008

(65) Prior Publication Data

US 2009/0064310 A1    Mar. 5, 2009

(30) Foreign Application Priority Data

Sep. 4, 2007   (JP) .................................. 2007-229490

(51) Int. Cl.
*G06F 15/16* (2006.01)
(52) U.S. Cl. .......................................... 726/13; 713/154
(58) Field of Classification Search ................... 713/154
See application file for complete search history.

(56) References Cited

U.S. PATENT DOCUMENTS

| | | | | |
|---|---|---|---|---|
| 5,915,087 | A * | 6/1999 | Hammond et al. | 726/12 |
| 5,951,651 | A * | 9/1999 | Lakshman et al. | 709/239 |
| 6,003,084 | A * | 12/1999 | Green et al. | 709/227 |
| 7,143,438 | B1 * | 11/2006 | Coss et al. | 726/11 |
| 7,225,269 | B2 * | 5/2007 | Watanabe | 709/238 |
| 7,451,306 | B2 * | 11/2008 | Culbert | 713/153 |
| 2004/0172557 | A1 * | 9/2004 | Nakae et al. | 713/201 |
| 2008/0320582 | A1 * | 12/2008 | Chen et al. | 726/12 |
| 2009/0031413 | A1 * | 1/2009 | Chang et al. | 726/13 |
| 2009/0044263 | A1 * | 2/2009 | Lingafelt et al. | 726/13 |
| 2010/0088755 | A1 * | 4/2010 | Gotare | 726/11 |

FOREIGN PATENT DOCUMENTS

| | | |
|---|---|---|
| JP | 11-168511 | 6/1999 |
| JP | 2003-273936 | 9/2003 |
| JP | 2003-345690 | 12/2003 |
| JP | 2004-304752 | 10/2004 |
| JP | 2004-348292 | 12/2004 |
| JP | 2005-27218 | 1/2005 |
| JP | 2006-5738 | 1/2006 |

OTHER PUBLICATIONS

English language translation of Notice of Reasons for Rejection mailed from the Japanese Patent Office on Aug. 30, 2011 in the related Japanese patent application no. 2007-229490.

* cited by examiner

*Primary Examiner* — Matthew Smithers
(74) *Attorney, Agent, or Firm* — Staas & Halsey LLP

(57) ABSTRACT

A data relay device has a plurality of security functions sequentially executes security functions on inputted data based on a predetermined rule, to determine whether or not to permit the relay of the data, and denies the relay of the data the relay is determined to be rejected. The data relay device has a determination result acquisition unit that acquires a determination result indicating permission or rejection of relay of the data, and a rule change unit that changes, based on the determination result acquired by the determination result acquisition unit, a rule defined for any one of the security functions located forward of the security function that has determined relay rejection, so that the relay of the communication data is determined to be rejected.

8 Claims, 15 Drawing Sheets

FIG. 3

| TRANSMISSION SOURCE ADDRESS | TRANSMISSION DESTINATION ADDRESS | PROTOCOL | PROCESSING CONTENT |
|---|---|---|---|
| 1.1.1.1 | 2.2.2.2 | HTTP | DISCARD |
| 4.4.4.4 | 5.5.5.5 | HTTP | RETURN |
| ... | ... | ... | ... |
| 8.8.8.8 | 9.9.9.9 | HTTP | DISCARD |

FIG. 6

| TRANSMISSION SOURCE ADDRESS | TRANSMISSION DESTINATION ADDRESS | PROTOCOL | PROCESSING CONTENT |
|---|---|---|---|
| 1.1.1.1 | 2.2.2.2 | HTTP | DISCARD |
| 4.4.4.4 | 5.5.5.5 | HTTP | RETURN |
| ... | ... | ... | ... |
| 8.8.8.8 | 9.9.9.9 | HTTP | DISCARD |
| 12.12.12.12 | 13.13.13.13 | HTTP | RELAY |

FIG. 8

| TRANSMISSION SOURCE ADDRESS | TRANSMISSION DESTINATION ADDRESS | PROTOCOL | DETERMINATION SOURCE IDENTIFICATION INFORMATION | DETERMINATION RESULT INFORMATION |
|---|---|---|---|---|
| 1.1.1.1 | 2.2.2.2 | HTTP | FV | PERMITTED |
| 1.1.1.1 | 2.2.2.2 | HTTP | AV | PERMITTED |
| 1.1.1.1 | 2.2.2.2 | HTTP | CF | REJECTED |
| 4.4.4.4 | 5.5.5.5 | HTTP | FW | PERMITTED |
| 4.4.4.4 | 5.5.5.5 | HTTP | AV | REJECTED |
| ... | ... | ... | ... | ... |

FIG. 9

| TRANSMISSION SOURCE ADDRESS | TRANSMISSION DESTINATION ADDRESS | PROTOCOL | DETERMINATION SOURCE IDENTIFICATION INFORMATION | DETERMINATION RESULT INFORMATION | NUMBER INFORMATION |
|---|---|---|---|---|---|
| 1.1.1.1 | 2.2.2.2 | HTTP | CF | REJECTED | 3 |
| 4.4.4.4 | 5.5.5.5 | HTTP | AV | REJECTED | 2 |
| ... | ... | ... | ... | ... | ... |

FIG. 11

| TRANSMISSION SOURCE ADDRESS | TRANSMISSION DESTINATION ADDRESS | PROTOCOL | APPLICATION TIME INFORMATION | EFFECTIVE TIME LIMIT INFORMATION |
|---|---|---|---|---|
| 4.4.4.4 | 5.5.5.5 | HTTP | 09:00-17:00 | 2007.8.10 |
| 8.8.8.8 | 9.9.9.9 | HTTP | 09:00-17:00 | 2007.8.11 |
| ... | ... | ... | ... | ... |

FIG. 14

| DETERMINATION SOURCE IDENTIFICATION INFORMATION | MAIL MAIN BODY |
|---|---|
| FW | A |
| AV | B |
| CF | C |

FIG. 15

| TRANSMISSION SOURCE ADDRESS | TRANSMISSION DESTINATION ADDRESS | PROTOCOL | DETERMINATION SOURCE IDENTIFICATION INFORMATION |
|---|---|---|---|
| 4.4.4.4 | 5.5.5.5 | HTTP | AV |
| 8.8.8.8 | 9.9.9.9 | HTTP | AV |
| ... | ... | ... | ... |

DATA RELAY DEVICE AND DATA RELAY METHOD

CROSS-REFERENCE TO RELATED APPLICATION

This application is based upon and claims the benefit of priority of the prior Japanese Patent Application No. 2007-229490, filed on Sep. 4, 2007, the entire contents of which are incorporated herein by reference.

BACKGROUND

Security functions in a computer network include access control performed based on an IP (Internet Protocol) address, inhibition of access to a specified content, and detection of a virus, and a technique has been contrived for each of these functions. For example, Patent Document 1 discloses a technique concerning a firewall for performing access control serving as a security function.

The above-mentioned various security functions can be implemented by separate devices. However, in recent years, a data relay device having a plurality of security functions in combination within a single device has emerged.

The use of a data relay device having a plurality of security functions in combination provides many advantages in terms of price and/or management as compared with a case in which a plurality of devices, each having only one security function, are combined so that the similar effects can be expected.

[Patent Document 1] JP-A-2003-273936

DESCRIPTION OF THE RELATED ART

A data relay device having a plurality of security functions in combination controls the relay of data by sequentially executing each security function.

Description will be made about this by taking the following specific example. Upon input of data, a data relay device having firewall and anti-virus functions first executes a firewall process on the inputted data, and then executes an anti-virus process thereon.

However, in such a data relay device, even if a security problem is found in data transmitted from a certain transmission source and the relay of the data from this transmission source is denied by the second anti-virus process, the first firewall process is executed on data inputted from the same transmission source and then the second anti-virus process is executed thereon similarly to the preceding processes upon subsequent input of data transmitted from the same transmission source.

Further, in the data relay device, if a security problem is found in data, the relay of the data is denied by the second anti-virus process. However, when thought is given to the execution of the first firewall process performed by this data relay device, the anti-virus process is resultantly a needless process. The occurrence of such a needless process becomes conspicuous with the increase in the number of security functions provided in the data relay device. In other words, there arises a problem that the greater the number of security functions provided in the data relay device, the greater the load applied to the device. Furthermore, when all of a plurality of security functions are set so as to be executed, throughput might be significantly reduced.

SUMMARY

Various embodiments of the present invention provide a data relay device that is capable of executing a plurality of security functions, the data relay device sequentially executing security functions on inputted data based on a predetermined rule defined for each of security functions, to determine whether or not to permit the relay of the data, and denying the relay of the data if the relay is determined to be rejected. The data relay device includes a determination result acquisition unit that acquires a determination result indicating permission or rejection of relay of the data, and a rule change unit that changes, based on the determination result acquired by the determination result acquisition unit, a rule defined for any one of the security functions located forward of the security function that has determined relay rejection, so that the relay of the communication data is determined to be rejected.

BRIEF DESCRIPTION OF THE DRAWINGS

FIG. 3 is a diagram showing an example of information stored in an access control rule retaining section.

FIG. 6 is a diagram showing an example of information stored in an access control rule retaining section.

FIG. 8 is a diagram showing an example of information stored in a determination result storage section.

FIG. 9 is a diagram showing an example of information stored in a relay rejection determination number storage section.

FIG. 11 is a diagram showing an example of information stored in a control information retaining section.

FIG. 14 is a diagram showing an example of information stored in a mail main body retaining section.

FIG. 15 is a diagram showing an example of information stored in a control information retaining section.

DETAILED DESCRIPTION OF THE EMBODIMENT

Hereinafter, preferred embodiments of a packet relay device will be described in detail with reference to the accompanied drawings.

First, referring to FIG. 1, an outline of a packet relay device according to one embodiment of the invention will be described.

Figure 1:
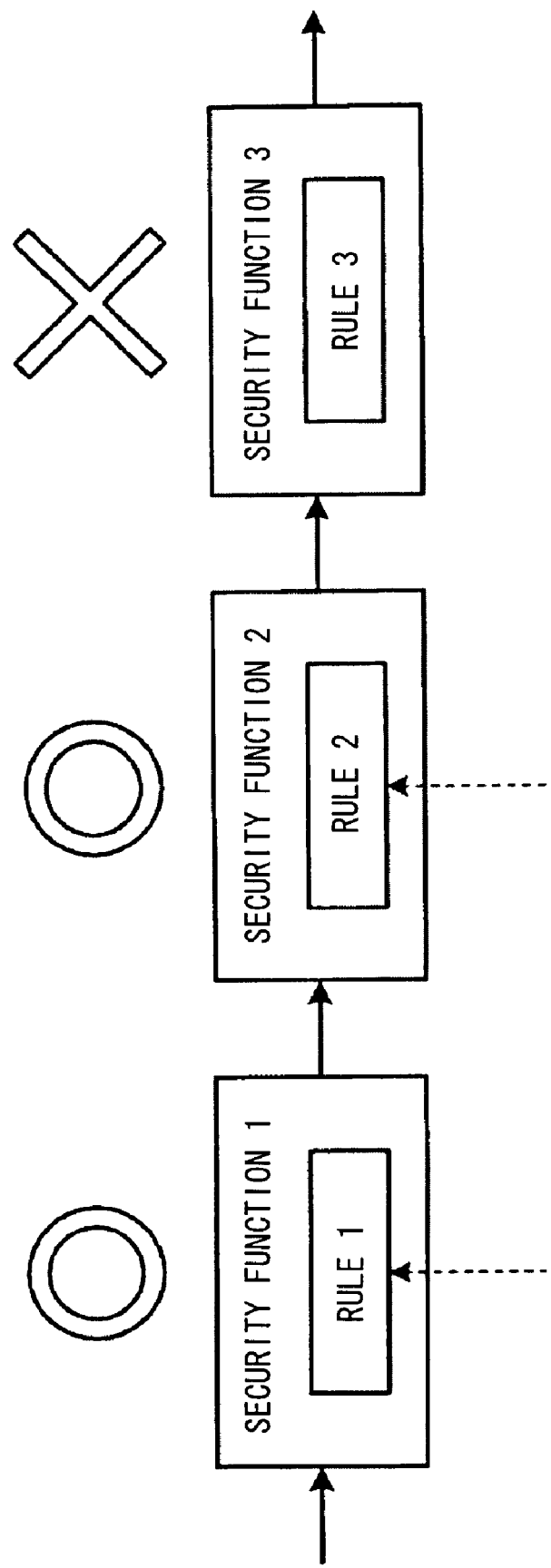
FIG. 1 is a diagram showing an outline of a packet relay device.

As shown in FIG. 1, the packet relay device has various security functions. Upon input of a packet, the packet relay device executes the respective security functions on the input packet in the order indicated by the arrows of FIG. 1. In FIG. 1, security functions are performed in the following order: Security Function 1, Security Function 2, and Security Function 3. Thus, the packet relay device determines whether or not to permit relaying of the packet. It should be noted that the packet relay device executes each security function based on a predetermined rule defined for each of the security functions.

The packet relay device executes the security functions, thereby deciding whether or not a security problem exists in the packet. When a result of the decision indicates the existence of the security problem in the packet, the packet relay device rejects relaying of the packet that is problematic, denies the relaying of the packet by, for example, discarding the packet or returning the packet to a transmission source, and does not execute unexecuted subsequent security functions. Then, upon input of the next packet, the respective security functions are similarly executed on the inputted packet in the order indicated by the arrows of FIG. 1.

On the other hand, the packet relay device determines that the relaying of the packet is permitted when the packet has no security problem as a result of the execution of all the security functions. The packet relay device then refers to path information concerning a relay destination of the packet retained in advance, for example, thus transmitting the packet to the next relay destination.

The packet relay device will be described in more detail. As shown in FIG. 1, suppose that the packet relay device has executed the third security function, Security Function 3, on a packet transmitted from a certain transmission source (1. 1. 1. 1), resulting in the detection of a security problem in the packet, and relaying of this packet is denied.

In this case, the packet relay device changes a rule defined for the first or second security function, that is Security Function 1 or Security Function 2, to "there is a security problem in a packet from the transmission source (1. 1. 1. 1)" so as to determine that the relay of a packet from the transmission source (1. 1. 1. 1) is rejected. By changing the rule defined for the security function in this manner, the packet relay device executes, on a packet transmitted from the same transmission source (1. 1. 1. 1) next time, the security function to be performed prior to Security Function 3 that has originally determined the existence of a problem in the packet. Thus, the packet relay device decides that the packet has a security problem, determines that the relay of the packet is rejected, and does not execute the security functions subsequent to the security function that found the security problem in the packet. As a result, the load applied to the data relay device is reduced. For example, if the existence of a security problem has been determined by executing the Security Function 1, and the relay of a packet has been determined to be rejected and the packet is discarded, the packet relay device does not execute the Security Functions 2 and 3.

[Configuration of Packet Relay Device]

Figure 2:
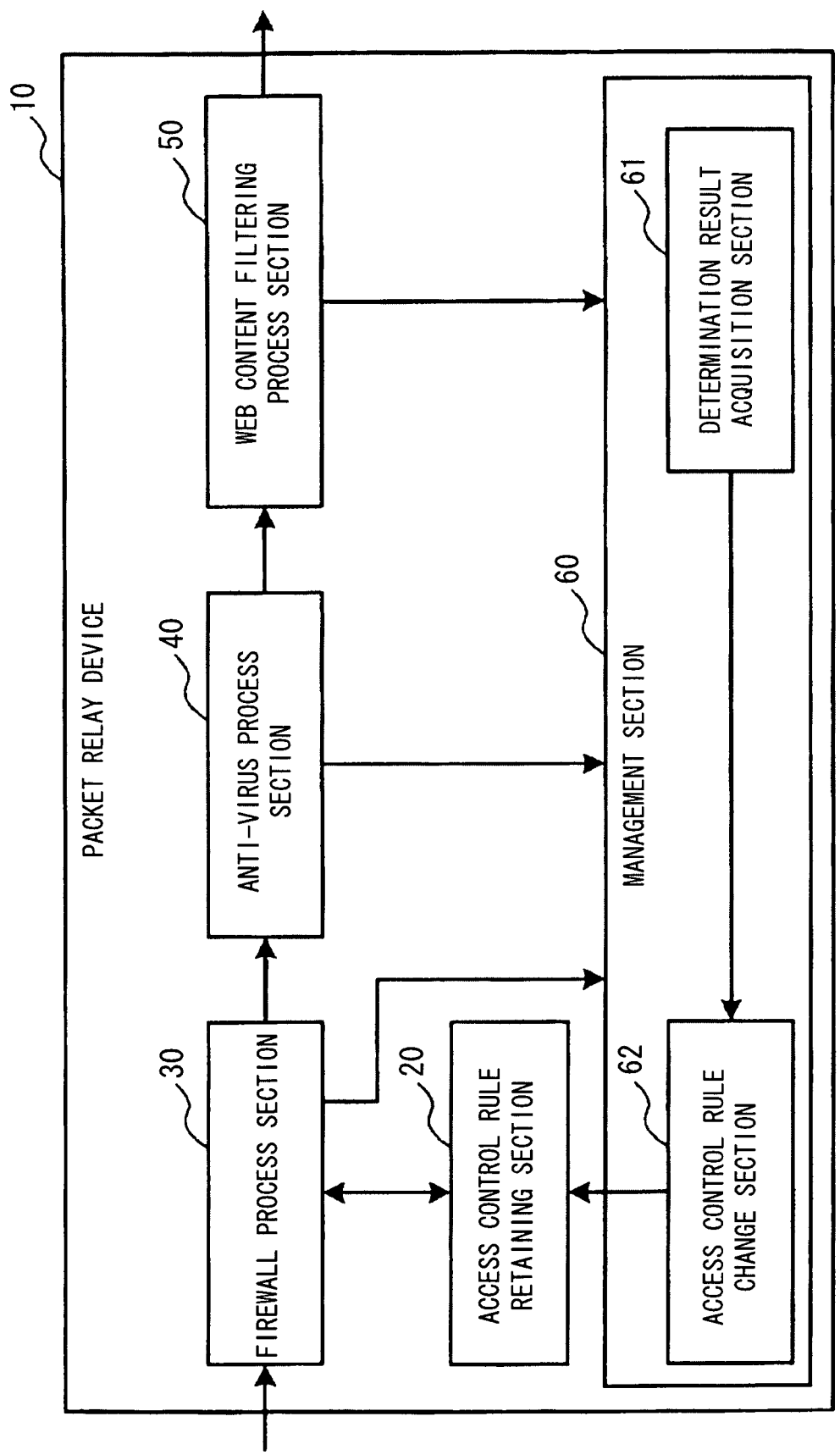
FIG. 2 is a block diagram showing a configuration of a packet relay device according to one embodiment of the invention.

Referring to FIG. 2, a configuration of the packet relay device according to the present embodiment will be described. As shown in FIG. 2, the packet relay device 10 includes an access control rule retaining section 20, a firewall process section 30, an anti-virus process section 40, a Web content filtering process section 50 and a management section 60.

The access control rule retaining section 20 retains a table to be used when the firewall process section 30 executes a security function. FIG. 3 is a diagram showing an example of information stored in the access control rule retaining section 20. As shown in FIG. 3, the access control rule retaining section 20 stores, in association with each other, a transmission source address, a transmission destination address, a protocol, and a processing content specifying a process performed on a packet, which are included in a header of a packet. For example, the access control rule retaining section 20 stores a transmission source address "1. 1. 1. 1", a transmission destination address "2. 2. 2. 2", a protocol "HTTP", and a processing content "discard" in association with each other.

The firewall process section 30 executes the initial security function on a packet inputted to the packet relay device 10. Upon input of a packet, the firewall process section 30 reads a transmission source address, a transmission destination address, and a protocol that are included in a header of the input packet. The firewall process section then searches the access control rule retaining section 20 for information corresponding to the read information.

When the information corresponding to the read information, the transmission source address, transmission destination address and protocol, is retained in the access control rule retaining section 20, the firewall process section 30 determines that the relay of the inputted packet has to be rejected. Then, the firewall process section 30 outputs information, i.e., the transmission source address, transmission destination address and protocol, that is acquired from the header of the input packet, and determination result information indicating a permission or rejection of the relay of the packet, to a determination result acquisition section 61 within the management section 60. When the relay of the packet is rejected, "rejected" is set as the determination result information.

Thereafter, the firewall process section 30 executes the processing content recorded associated with the association of the transmission source address, transmission destination address and protocol. The process executed by the firewall process includes discarding of the packet, or returning the packet to the transmission source. It should be noted that "determination result information" refers to information indicating result of determination, either of relay rejection or relay permission, which is generated by the firewall process section 30, the anti-virus process section 40 or the Web content filtering process section 50 after the determination of permitting or rejecting the relay of the packet is performed. Herein, information indicating that the relay of the packet is rejected is defined as determination result information "rejected", while information indicating that the relay of the packet is permitted is defined as determination result information "permitted".

On the other hand, when the association of the transmission source address, transmission destination address and protocol concerning the input packet is not recorded in the access control rule retaining section 20, the firewall process section 30 determines that the relay of this packet is permitted. Then, the firewall process section 30 outputs information such as the transmission source address, transmission destination address and protocol acquired from the header of the packet of which the relay is permitted, and determination result information "permitted" to the determination result acquisition section 61 within the management section 60. Thereafter, the firewall process section 30 outputs the packet to the anti-virus process section 40.

The anti-virus process section 40 executes the second security function on the packet inputted to the packet relay device 10. Upon receiving the packet from the firewall process section 30, the anti-virus process section 40 determines whether or not information considered as a virus is contained in a data portion of the packet excluding the header by performing pattern matching process, for example.

Then, when information considered as a virus is detected from the packet, the anti-virus process section 40 determines that the relay of this packet is rejected. Then, the anti-virus process section 40 outputs information such as the transmission source address, transmission destination address and protocol acquired from the header of the packet of which the relay is rejected, and determination result information "rejected", to the determination result acquisition section 61 within the management section 60. Thereafter, the anti-virus process section 40 discards the packet.

On the other hand, when information considered as a virus is not detected from the packet, the anti-virus process section 40 determines that the relay of the packet is permitted. Then, the anti-virus process section 40 outputs information acquired from the header of the packet of which the relay is permitted, i.e., the transmission source address, transmission destination address and protocol, and determination result information "permitted", to the determination result acquisition section 61 within the management section 60. Thereafter, the anti-virus process section 40 outputs the packet to the Web content filtering process section 50.

The Web content filtering process section 50 executes the third security function on the packet inputted to the packet relay device 10. Upon receiving the packet from the anti-virus process section 40, the Web content filtering process section 50 determines whether or not information indicating a specific word is contained in a data portion of the packet, excluding the header, by performing pattern matching process, for example.

Then, when a specific word is detected from the inputted packet, the Web content filtering process section 50 determines that the relay of this packet is rejected. Then, the Web content filtering process section 50 outputs information acquired from the header of the packet of which the relay is rejected, i.e., the transmission source address, transmission destination address and protocol, and determination result information "rejected", to the determination result acquisition section 61 within the management section 60. Thereafter, the Web content filtering process section 50 discards the packet.

On the other hand, when information, such as a specific word, is not detected from the inputted packet, the Web content filtering process section 50 determines that the relay of this packet is permitted. Then, the Web content filtering process section 50 outputs information acquired from the header of the packet of which the relay is permitted, i.e., the transmission source address, transmission destination address and protocol, and determination result information "permitted", to the determination result acquisition section 61 within the management section 60, and thereafter outputs this packet to the next relay destination.

The management section 60 serves as a control section for managing process operations of the firewall process section 30, the anti-virus process section 40 and the Web content filtering process section 50. The management section 60 includes the determination result acquisition section 61 and an access control rule change section 62.

The determination result acquisition section 61 acquires a determination result indicating permission or rejection of the packet relaying from each process section. Then, when receiving determination result information "rejected" along with the transmission source address, transmission destination address and protocol associated with the packet from the anti-virus process section 40 or the Web content filtering process section 50, the determination result acquisition section 61 outputs the received transmission source address, transmission destination address, protocol and determination result information "rejected" to the access control rule change section 62.

Based on the determination result acquired by the determination result acquisition section 61, the access control rule change section 62 changes a rule defined for any one of the security functions located forward of the security function that has determined relay rejection of a predetermined packet, so as to determine that the relay of the packet shall be rejected. Upon receiving determination result information "rejected" along with the transmission source address, transmission destination address and protocol from the determination result acquisition section 61, the access control rule change section 62 further associates the processing content "discard" with the received transmission source address, transmission destination address and protocol. The access control rule change section 62 then writes information in which the processing content "discarded" is associated to the access control rule retaining section 20.

[Process of Packet Relay Device]

Next, a process operation of the packet relay device 10 will be described with reference to a flow chart shown in FIG. 4. The process flow shown in FIG. 4 is a process repeatedly executed during the operation of the packet relay device 10.

Figure 4:
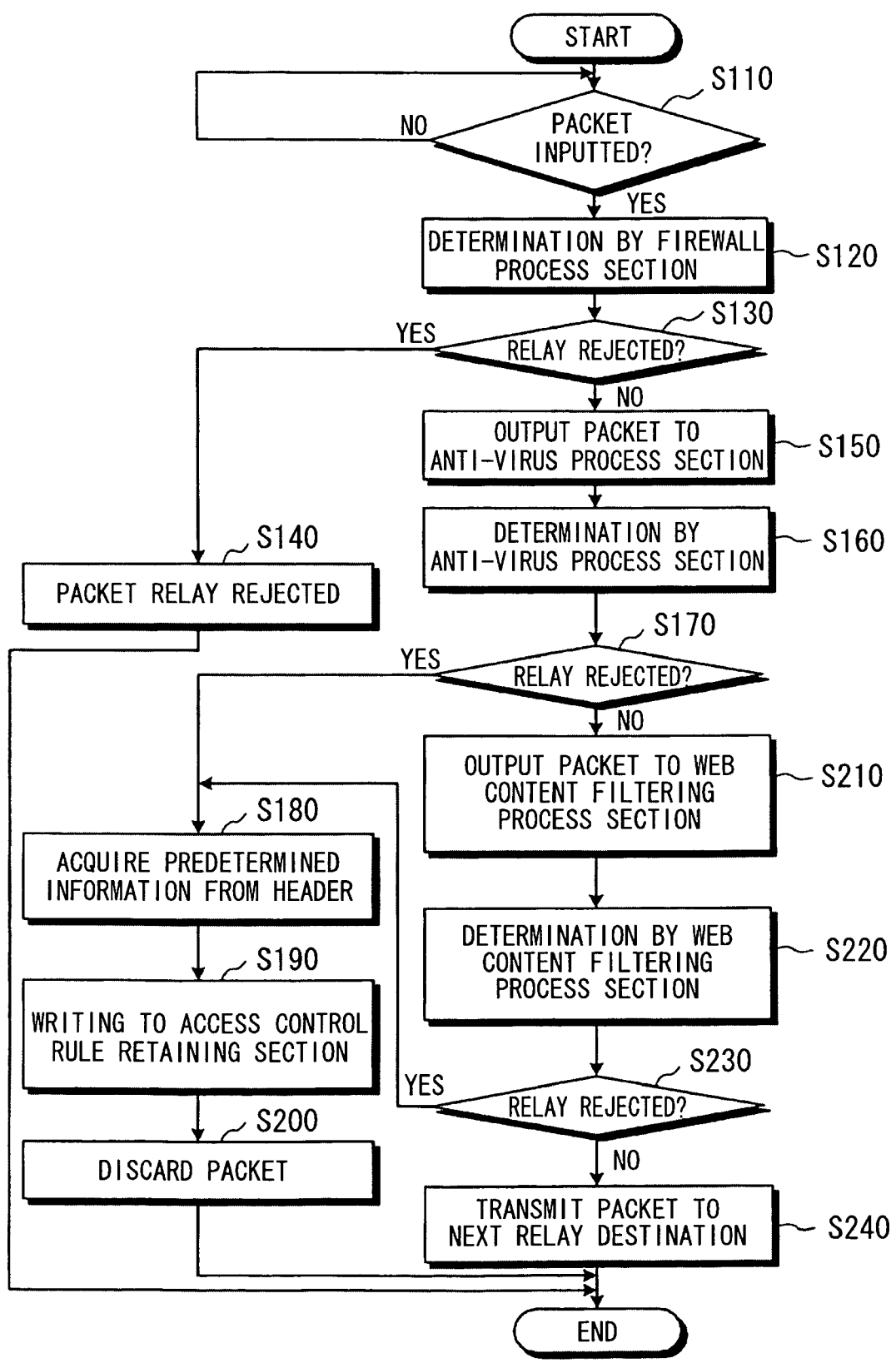
FIG. 4 is a flow chart showing the flow of processes performed by the packet relay device.

As shown in FIG. 4, upon input of a packet (S110 Yes), the firewall process section 30 determines whether or not to permit the relay of the packet (S120). When the firewall process section 30 determines that the relay of the packet is rejected (S130 Yes), the relay of the packet is denied, and the packet is discarded or returned to the transmission source (S140).

On the other hand, when the packet relay is determined to be permitted as a result of the packet relay permission/rejection determination by the firewall process section 30 (S130 No), the packet is outputted from the firewall process section 30 to the anti-virus process section 40 (S150) Then, the anti-virus process section 40 determines whether or not to permit the relay of the packet (S160).

When the packet relay is determined to be rejected as a result of the determination by the anti-virus process section 40 (S170 Yes), predetermined pieces of information, such as the transmission source address, transmission destination address and protocol, are acquired from the header of the packet of which the relay is rejected (S180). Then, the packet relay device 10 writes these pieces of information, i.e., the transmission source address, transmission destination address and protocol, with which the packet-processing content "discard" is further associated, to the access control rule retaining section 20 (S190). The anti-virus process section 40 then discards the packet of which the relay is rejected (S200).

On the other hand, when the packet relay is determined to be permitted as a result of the determination by the anti-virus process section 40 (S170 No), the packet is outputted from the anti-virus process section 40 to the Web content filtering process section 50 (S210). Then, the Web content filtering process section 50 determines whether or not to permit the relay of the packet (S220).

When the packet relay is determined to be rejected as a result of the determination by the Web content filtering process section 50 (S230 Yes), the process of S180 to S200 are executed. Thus, predetermined pieces of information are acquired from the header of the packet of which the relay is rejected, and the pieces of information with which the processing content "discard" is further associated is written to the access control rule retaining section 20. Then, the packet the relay is rejected is discarded.

When the relay is determined to be permitted as a result of the packet relay permission/rejection determination by the Web content filtering process section 50 (S230 No), the packet relay device 10 transmits the packet to the next relay destination (S240), thus ending the process shown in FIG. 4.

According to the foregoing example, a packet relay permission/rejection determination result is acquired from any one of the process sections. And, based on the acquired determination result, the access control rule retaining section to which the process section located forwarding the process section that has determined relay rejection is changed, so as relaying of the packet is determined to be rejected.

In this example, the security process of the anterior process section is executed on a packet transmitted from the same transmission source. Thus, the relay is determined to be rejected, and the security processes of the subsequent process sections are not executed.

In this example, the load applied to the packet relay device can be reduced.

Another embodiment of the present invention will be discussed.

In this embodiment, the following measures may be conceivable. A packet in which the relay is permitted by all the process sections determining whether or not to permit the relay, is considered as having no security problem henceforth. Therefore, when a packet is inputted from the same transmission source next time, the relay of the packet is permitted without executing the security processes by process sections subsequent to a predetermined process section. By performing such a process, the number of processes performed on a packet can be reduced, thus making it possible to further reduce the load applied to the packet relay device.

[Configuration of Packet Relay Device]

Figure 5:
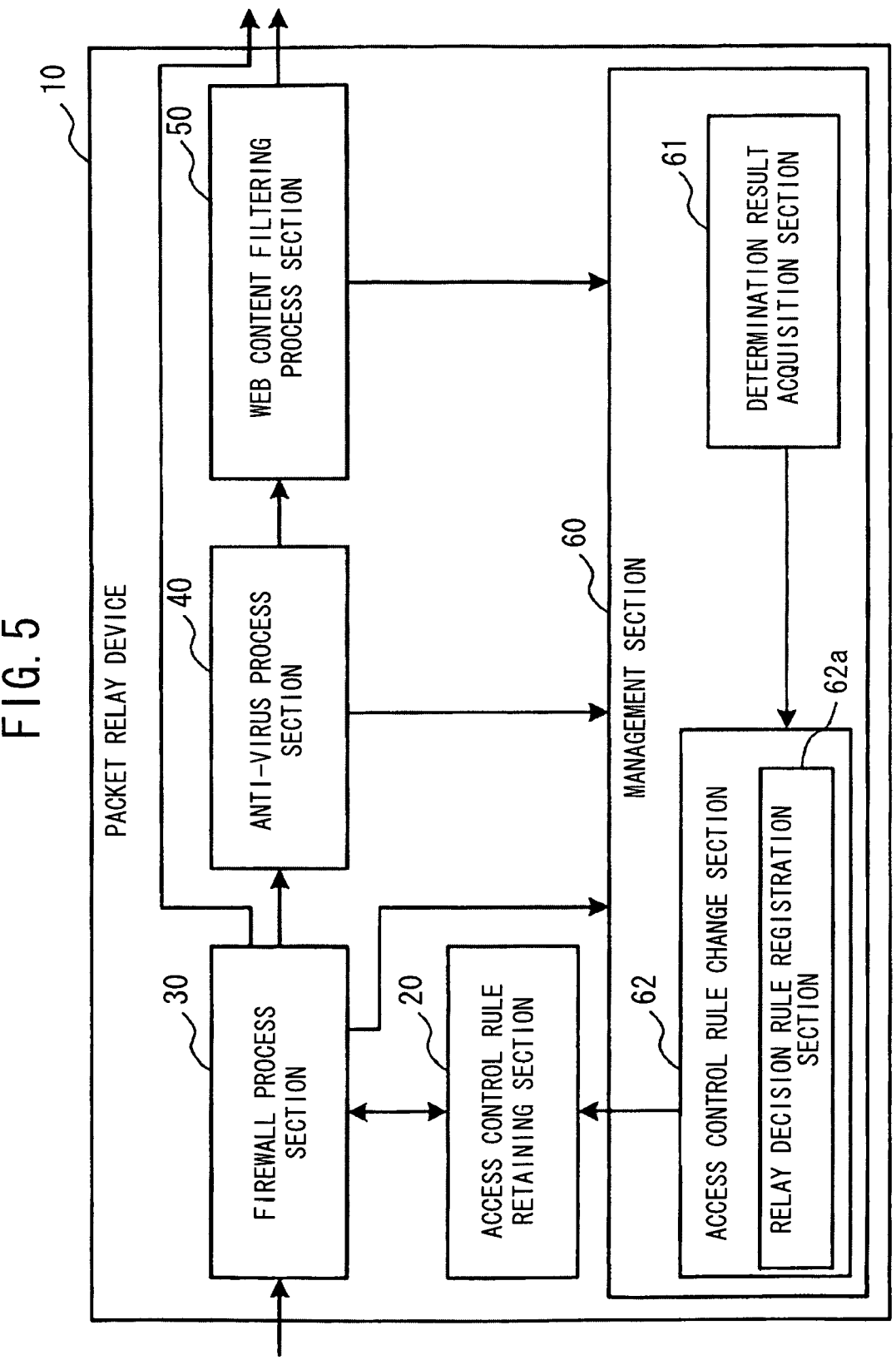
FIG. 5 is a block diagram showing an exemplary configuration of a packet relay device.

Referring to FIG. 5, an exemplary configuration of a packet relay device of the present embodiment will be described.

As shown in FIG. 5, the packet relay device 10 includes an access control rule retaining section 20, a firewall process section 30, an anti-virus process section 40, a Web content filtering process section 50 and a management section 60. The packet relay device 10 differs from the packet relay device shown in FIG. 1 in that a relay decision rule registration section 62a is provided within an access control rule change section 62 of the management section 60. It should be noted that the description of the elements, which perform process operations and functions similar to those shown in FIG. 1, will be omitted. Hereinafter, a determination result acquisition section 61, the access control rule change section 62, the access control rule retaining section 20 and the firewall process section 30 will be described.

Upon receiving determination result information "permitted" along with the transmission source address, transmission destination address and protocol concerning the received packet from the Web content filtering process section 50 that lastly performs a process on the received packet, the determination result acquisition section 61 outputs the received transmission source address, transmission destination address, protocol and determination result information "permitted" to the access control rule change section 62.

When there is a packet in which the relay is permitted as a result of the execution of all the processes of the firewall process section 30, the anti-virus process section 40 and the Web content filtering process section 50, the access control rule change section 62 changes the rule recorded in the access control rule retaining section 20, so that when the process of the firewall process section 30 was executed on a packet from the same transmission source as the packet the relay is permitted, the relay permission is permitted without executing the processes of the subsequent process sections.

Upon receiving determination result information "permitted" along with the transmission source address, transmission destination address and protocol of the packet in which the relay is permitted from the determination result acquisition section 61, the access control rule change section 62 associates a processing content "relay" with the received transmission source address, transmission destination address and protocol by the relay decision rule registration section 62a.

Then, the determination result acquisition section 62 writes the information that the processing content "relay" is associated to the access control rule retaining section 20.

FIG. 6 is a diagram showing an example of information stored in the access control rule retaining section 20. As shown in FIG. 6, as a result of the processes of the respective sections, the access control rule retaining section 20 stores the association that associates a transmission source address "12. 12. 12. 12", a transmission destination address "13. 13. 13. 13", a protocol "HTTP", and the processing content "relay" with each other in association with the packet the relay is permitted.

Upon input of a packet, the firewall process section 30 reads information associating the transmission source address, transmission destination address and protocol included in the header of the inputted packet, and searches the access control rule retaining section 20 for information corresponding to each piece of read information. Then, when the information corresponding to each piece of the read information is recorded in the access control rule retaining section 20 and the processing content "relay" is associated with the information, the firewall process section 30 transmits the input packet to the next relay destination without intervention of the anti-virus process section 40 and the Web content filtering process section 50.

On the other hand, when "relay" is not recorded as the processing content, a process is executed on a packet in accordance with the processing content recorded in a processing content column. Further, when the association of the transmission source address, transmission destination address and protocol is not stored in the access control rule retaining section, the process similar to that shown in FIG. 4 is executed as necessary.

As described above, when there is a packet the relay is permitted as a result of the execution of all the security processes of the process sections determining permission of the relay, the packet relay device shown in FIG. 5 performs the following process. Upon receiving a packet from the same transmission source as the previous packet, a change is made to the access control rule retaining section 20 so that when the process of the firewall process section 30 was executed on a newly received packet, the packet relay is permitted without executing the processes of the subsequent anti-virus process section 40 and the Web content filtering process section 50.

The packet relay device shown in FIG. 5 can reduce the number of processes performed on a packet, and can further reduce the load applied to the packet relay device.

Another embodiment of the present invention is described. In the present embodiment, the following measures may be taken. When the second or subsequent process section determines that the relay of the packet has to be rejected for the first time, the rule retained in the access control rule retaining section 20 is not changed. Then, when the relay of a subsequent packet sent from the same transmission source as the previously rejected packet is determined to be rejected for a predetermined number of times, the access control rule is changed. These measures are taken to cope with the case where an operational problem occurs if a change is made to the access control rule retaining section 20 uniformly in accordance with only the process result of the process section that determines whether or not to permit the relay. Conceivable problems may include a situation in which, due to erroneous detection of a virus, or use of a temporary transmission source address by a criminal planning to cause infection with a virus, for example, the access control rule retaining section 20 is unnecessarily changed, and a packet that should originally be relayed is discarded.

[Configuration of Packet Relay Device]

Figure 7:
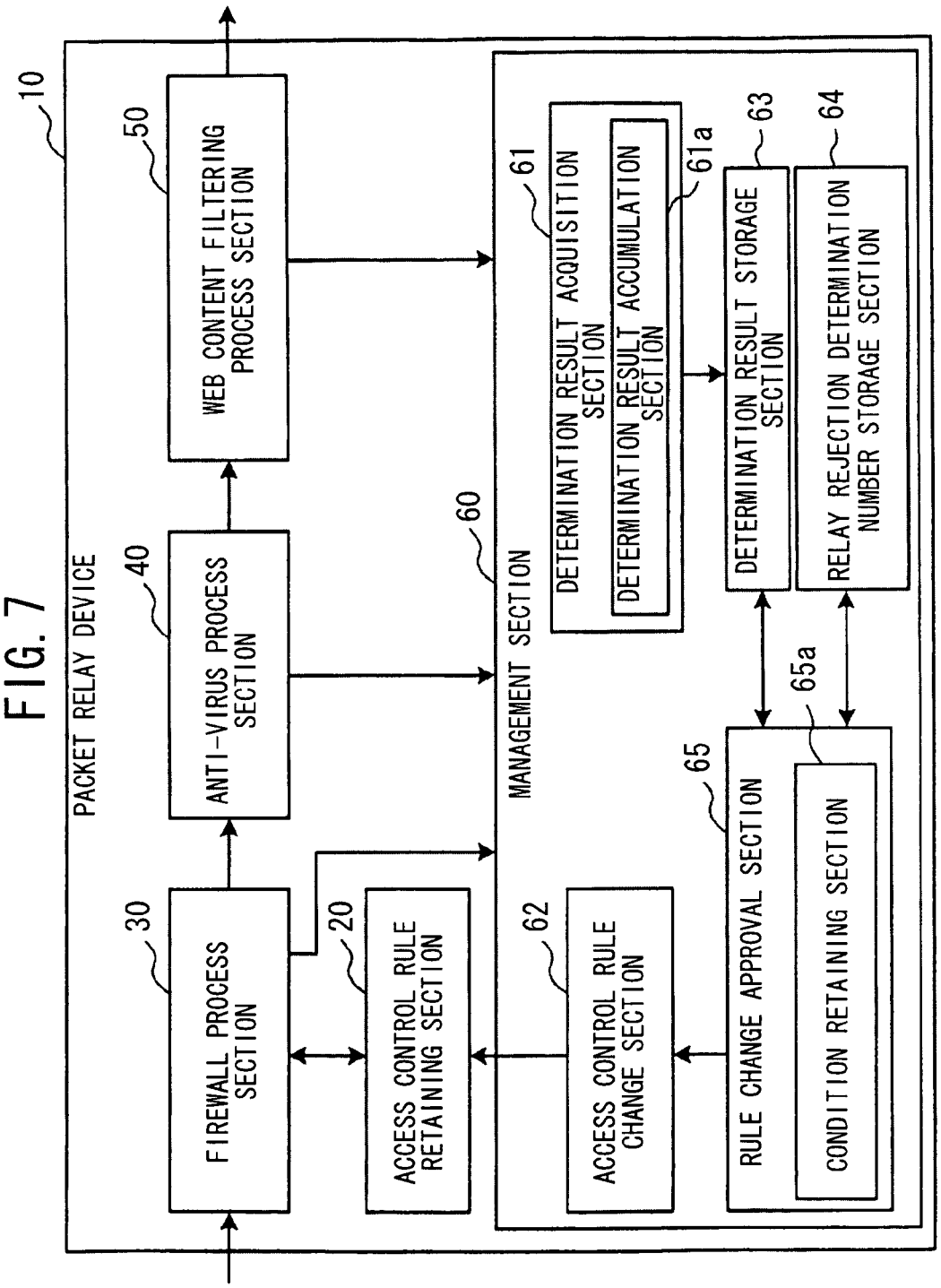
FIG. 7 is a block diagram showing an exemplary configuration of a packet relay device.

Referring to FIG. 7, an exemplary configuration of a packet relay device of the present embodiment will be described.

As shown in FIG. 7, the packet relay device 10 includes an access control rule retaining section 20, a firewall process section 30, an anti-virus process section 40, a Web content filtering process section 50 and a management section 60. The packet relay device 10 differs from the packet relay device shown in FIG. 1 in that the management section 60 further includes a determination result storage section 63, a relay rejection determination number storage section 64 and a rule change approval section 65. Further, a determination result accumulation section 61a and a condition retaining section 65a are provided within a determination result acquisition section 61 and within the rule change approval section 65, respectively.

It should be noted that the description of the elements, which perform process operations and functions similar to those shown in FIG. 1, will be omitted. Hereinafter, in particular, the determination result acquisition section 61, the determination result accumulation section 61a, an access control rule change section 62, the determination result storage section 63, the relay rejection determination number storage section 64, the rule change approval section 65 and the condition retaining section 65a will be described.

The determination result storage section 63 stores determination results obtained by the processes of the firewall process section 30, the anti-virus process section 40 and the Web content filtering process section 50 that are performed on a packet. FIG. 8 is a diagram showing an example of information stored in the determination result storage section 63. As shown in FIG. 8, the determination result storage section 63 stores, in association with each other, a transmission source address, a transmission destination address, a protocol, determination source identification information uniquely identifying the process section that has determined whether or not to permit the relay of a packet, and determination result information indicating determination result of either rejecting relay or permitting relay. For example, as shown in FIG. 8, the determination result storage section 63 stores, in association with each other, a transmission source address "1. 1. 1. 1", a transmission destination address "2. 2. 2. 2", a protocol "HTTP", determination source identification information "FW", and determination result information "permitted". This signifies that the relay of a packet from the transmission source address "1. 1. 1. 1" to the transmission destination address "2. 2. 2. 2" is determined to be "permitted" by "FW", that is the firewall process section 30. It should be noted that "FW", "AV" and "CF" are associated with the firewall process section 30, the anti-virus process section 40 and the Web content filtering process section 50, respectively.

The relay rejection determination number storage section 64 stores, for each packet or each transmission source of a packet, the number of times the relay has been determined to be rejected. FIG. 9 is a diagram showing an example of information stored in the relay rejection determination number storage section 64. As shown in FIG. 9, the relay rejection determination number storage section 64 stores, in association with each other, a transmission source address, a transmission destination address, a protocol, determination source identification information, determination result information, and number information indicating the number of times the relay has been determined to be rejected.

For example, as shown in FIG. 9, the relay rejection determination number storage section 64 stores, in association with each other, a transmission source address "1. 1. 1. 1", a transmission destination address "2. 2. 2. 2", a protocol "HTTP", determination source identification information "CF", determination result information "rejected", and number information "3". This signifies that the relay of a packet transmitted from the transmission source address "1. 1. 1. 1" is determined to be rejected for three times in total by the Web content filtering process section 50.

Upon receiving the determination result information along with a transmission source address, a transmission destination address and a protocol from the firewall process section 30, the anti-virus process section 40 and the Web content filtering process section 50, the determination result accumulation section 61a associates the received transmission source address, transmission destination address, protocol and determination result information with each other. Then, the process section serving as a reception source of each piece of information is identified, and determination source identification information is further associated therewith and stored in the determination result storage section 63. It should be noted that even when receiving determination result information "rejected" along with a transmission source address, a transmission destination address and a protocol from the anti-virus process section 40 or the Web content filtering process section 50, the determination result acquisition section 61 does not output the transmission source address, transmission destination address, protocol and determination result information "rejected" to the access control rule change section 62.

When a determination result, accumulated in the determination result storage section 63 by the determination result accumulation section 61a, satisfies a predetermined condition, the rule change approval section 65 approves a rule change for the access control rule change section 62.

Every time determination result information "rejected" is stored in the determination result storage section 63, the rule change approval section 65 calculates, based on information stored in the determination result storage section 63, the number of times that a packet is determined to be rejected.

The rule change approval section 65 further associates the calculated number of times, serving as number information, with the association of the transmission source address, transmission destination address, protocol, determination source identification information and determination result information "rejected" actually stored in the determination result storage section 63. Then, the rule change approval section 65 stores information that the determination result information "rejected" is associated in the relay rejection determination number storage section 64.

Based on a predetermined condition retained in advance in the condition retaining section 65a, e.g., a condition that requires "the number of times of determination of relay rejection to be five or more times", the rule change approval section 65 decides whether or not the number of times indicated by the number information satisfies the predetermined condition.

When the number of times stored in the relay rejection determination number storage section 64 satisfies the predetermined condition, the rule change approval section 65 reads the transmission source address, transmission destination address, protocol and determination result information "rejected" actually stored in the determination result storage section 63, and outputs them to the access control rule change section 62.

Upon receiving the determination result information "rejected" along with the transmission source address, transmission destination address and protocol from the rule change approval section 65, the access control rule change section 62 further associates the processing content "discard"

with the association of the transmission source address, transmission destination address and protocol, and writes the association to the access control rule retaining section 20.

As described above, in the packet relay device shown in FIG. 7, a packet relay permission/rejection determination result for each packet or transmission source is accumulated, and when the accumulated determination result satisfies a predetermined condition, a change is made to the access control rule retaining section 20.

The packet relay device shown in FIG. 7 enables a flexible operation of the packet relay device.

Moreover, the following measures may be taken in the another embodiment to be described. In the present embodiment, instead of continuously maintaining the change made to the access control rule retaining section 20, an effective period or application period is set for the rule change so that the change made to the access control rule retaining section 20 serves as a temporary or limited change. These measures can cope with a case where it is undesirable to permanently maintain the change made to the access control rule retaining section 20, or a case where it is desired to control the operation of the packet relay device in accordance with an operational situation or the like that occurs during a time period of a day, such as a case where a change is unnecessarily made to the access control rule retaining section 20 due to erroneous detection of a virus or use of a temporary transmission source address by a criminal planning to cause an infection with a virus.

[Configuration of Packet Relay Device]

Figure 10:
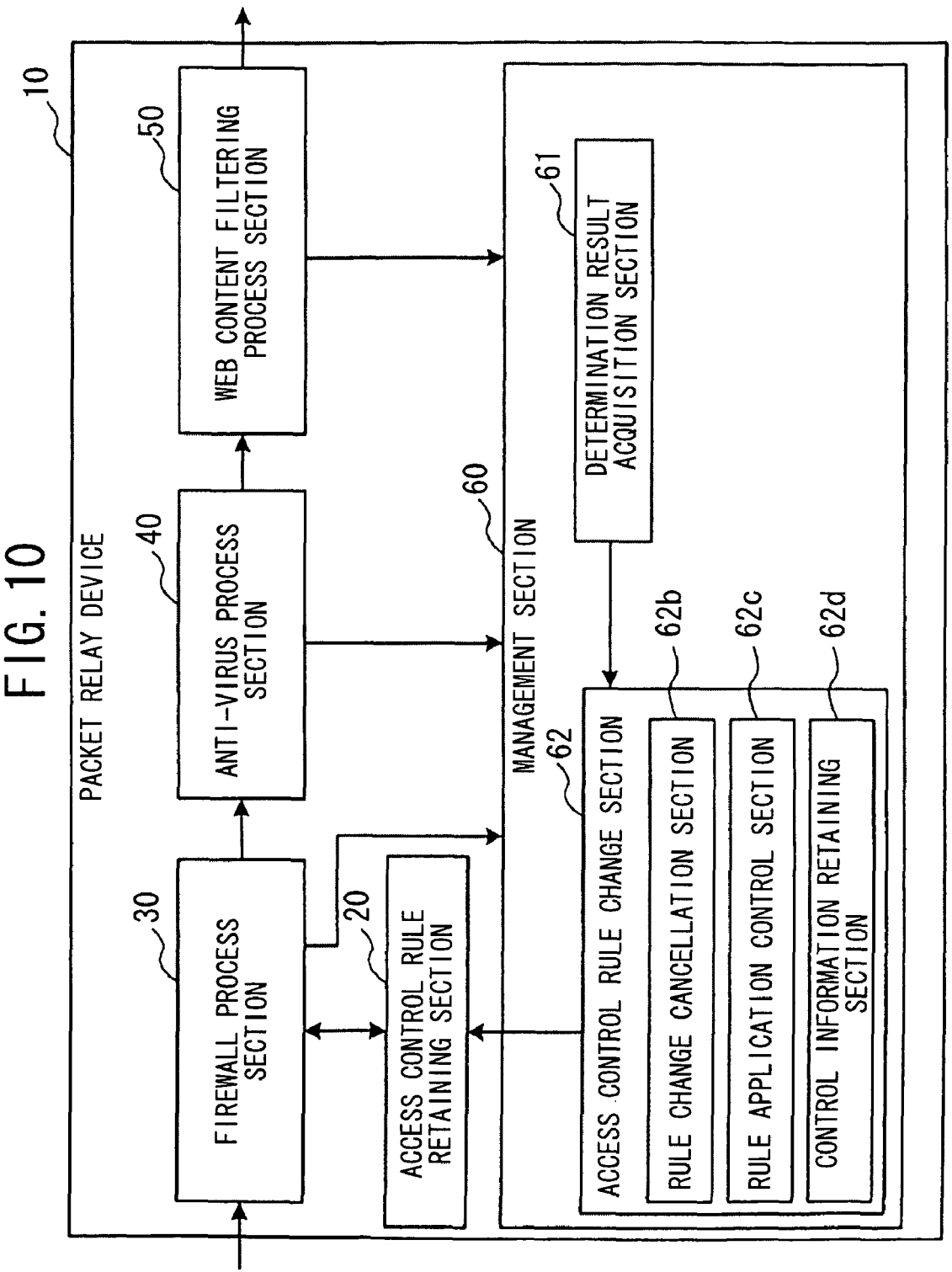
FIG. 10 is a block diagram showing an exemplary configuration of a packet relay device.

Referring to FIG. 10, an exemplary configuration of a packet relay device will be described.

As shown in FIG. 10, the packet relay device 10 includes an access control rule retaining section 20, a firewall process section 30, an anti-virus process section 40, a Web content filtering process section 50 and a management section 60. An access control rule change section 62 of the management section 60 internally includes a rule change cancellation section 62b, a rule application control section 62c, and a control information retaining section 62d. It should be noted that the description of the elements, which perform process operations and functions similar to those shown in FIG. 1, will be omitted. Hereinafter, the access control rule change section 62, the rule change cancellation section 62b, the rule application control section 62c and the control information retaining section 62d will be described.

The control information retaining section 62d stores information to which reference is made by the rule change cancellation section 62b and rule application control section 62c. FIG. 11 is a diagram showing an example of information stored in the control information retaining section 62d. As shown in FIG. 11, the control information retaining section 62d stores, in association with each other, a transmission source address, a transmission destination address and a protocol of a packet, application time information indicating a time period during which a change made to the access control rule retaining section 20 is maintained, and effective time limit information indicating a date at which a change made to the access control rule retaining section 20 is finally cancelled. For example, the control information retaining section 62d stores, in association with each other, a transmission source address "4. 4. 4. 4", a transmission destination address "5. 5. 5. 5", a protocol "HTTP", application time information "09:00 to 17:00" which means a time period from 9 a.m. to 5 p.m. in a day, and effective time limit information "2007. 8. 10" that means Aug. 10, 2007. This signifies that, for a packet from the transmission source with the transmission source address "4. 4. 4. 4", the changed access control rule is maintained during a time period from 9 a.m. to 5 p.m., while the changed access control rule is cancelled on Aug. 10, 2007.

Upon receiving the determination result information "rejected" along with a transmission source address, a transmission destination address and a protocol from the determination result acquisition section 61, the access control rule change section 62 further associates application time information and effective time limit information with the association of the received transmission source address, transmission destination address and protocol. Then, the access control rule change section 62 stores the resultant association in the control information retaining section 62d. It should be noted that application time information and effective time limit information may be associated with the association of a transmission source address, a transmission destination address and a protocol as follows. For example, determination source identification information may be further outputted from the determination result acquisition section 61 to distinguish the associations of transmission source addresses, transmission destination addresses and protocols from each other for each determination source that has determined relay rejection, and to associate effective time limit information and/or application time information different for each process section.

Now, description will be made to an initial writing operation performed on the access control rule retaining section 20 by the rule application control section 62c of the access control rule change section 62. Prior to the start of the writing operation for the access control rule, the rule application control section 62c of the access control rule change section 62 compares the current time with application time information stored in the control information retaining section 62d. If the current time falls within a time period during which a change made to the access control rule retaining section 20 should be maintained, the rule application control section 62c reads a transmission source address, a transmission destination address and a protocol from the control information retaining section 62d, further associates the processing content "discard" with the association of the transmission source address, transmission destination address and protocol The rule application control section 62c then writes the resultant association to the access control rule retaining section 20.

On the other hand, when the current time does not fall within a time period during which a change made to the access control rule retaining section 20 should be maintained, the rule application control section 62c does not change the access control rule. Further, at a time point when the current time becomes the start time of a time period during which a change made to the access control rule retaining section 20 is maintained, the rule application control section 62c reads a transmission source address, a transmission destination address and a protocol from the control information retaining section 62d, further associates the processing content "discard" with the association of the transmission source address, transmission destination address and protocol. The rule application control section 62c then writes the resultant association to the access control rule retaining section 20.

Figure 12:
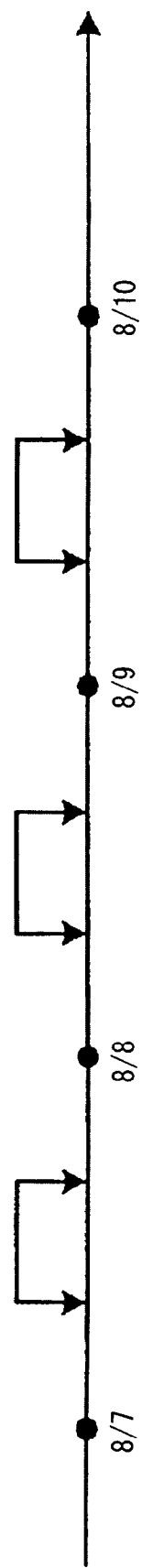
FIG. 12 is a diagram for describing an example of changing state of an access control rule retaining section.

Upon finishing the initial access control rule writing as described above, the rule application control section 62c and the rule change cancellation section 62b perform control so that a change made to the access control rule retaining section 20 is maintained only during a specified time period, or cancel a change made to the access control rule retaining section 20, based on the application time information and/or effective time limit information stored in the control information retaining section 62d. Thus, as shown in FIG. 12, for example, when the application time information "09:00 to 17:00" and the effective time limit information "2007. 8. 10" are stored in the control information retaining section 62d in association with the association of a transmission source address, a transmission destination address and a protocol at 8 a.m. on August 7, a change made to the access control rule retaining section 20 is maintained only during time periods from 9 a.m. to 5 p.m. on August 7, August 8 and August 9. In FIG. 12, the arrows indicate "9 a.m." and "5 p.m." signifying a time period during which a rule change is applied. It should be noted that from August 10 onward, no change is made to the access control rule retaining section 20 because the effective time limit is up.

When the current time becomes the ending time of a time period, which is indicated by the application time information stored in the control information retaining section 62d and during which a change made to the access control rule retaining section 20 is maintained, the rule application control section 62c reads a transmission source address, a transmission destination address and a protocol associated with the application time information. Then, the rule application control section 62c deletes association information indicative of the transmission source address, transmission destination address and protocol identical to the read association among the associations stored by the access control rule retaining section 20.

Further, when the current time becomes the start time of a time period, which is indicated by the application time information stored in the control information retaining section 62d and during which a change made to the access control rule retaining section 20 is maintained, the rule application control section 62c reads a transmission source address, a transmission destination address and a protocol associated with this application time information, further associates the processing content "discard" with the association of the transmission source address, transmission destination address and protocol. The rule application control section 62c then writes the resultant association to the access control rule retaining section 20. It should be noted that the rule application control section 62c repeats the similar process thereafter.

Furthermore, when the current time becomes the time indicated by the effective time limit information stored in the control information retaining section 62d, the rule change cancellation section 62b reads a transmission source address, a transmission destination address and a protocol associated with the effective time limit information indicative of the current time from the control information retaining section 62d, and deletes information indicative of the association of the transmission source address, transmission destination address and protocol from the control information retaining section 62d. Moreover, the rule change cancellation section 62b deletes the association of the transmission source address, transmission destination address and protocol identical to those of the association read from the control information retaining section 62d, among the associations stored by the access control rule retaining section 20.

As described above, the packet relay device shown in FIG. 10 sets, when a rule is changed, an effective period for the changed rule, and cancels the rule change if the effective period has elapsed.

Besides, the packet relay device shown in FIG. 10 sets, when a rule is changed, a time condition for the application of the changed rule, and controls the application permission/rejection of the changed rule based on time information.

In addition, when the relay of a packet is denied, it is possible to take the measures of transmitting a mail to a predetermined transmission destination in an embodiment described hereafter. In this case, the content of a mail to be transmitted differs depending on which one of the firewall process section 30, the anti-virus process section 40 and the Web content filtering process section 50 has performed a process for denying the packet relay. Furthermore, even if the relay is denied by the firewall process section 30 that is different from the original process section based on a change made to the access control rule retaining section 20, a mail, having the content similar to the case where the packet relay is denied by the process of the original process section, is transmitted. These measures are taken to cope with the situation where the relay of a predetermined packet is denied by the process of the firewall process section 30 different from the original process section due to a change made to the access control rule change section 62, resulting in the transmission of a mail having a different content to a predetermined transmission destination.

[Configuration of Packet Relay Device]

Figure 13:
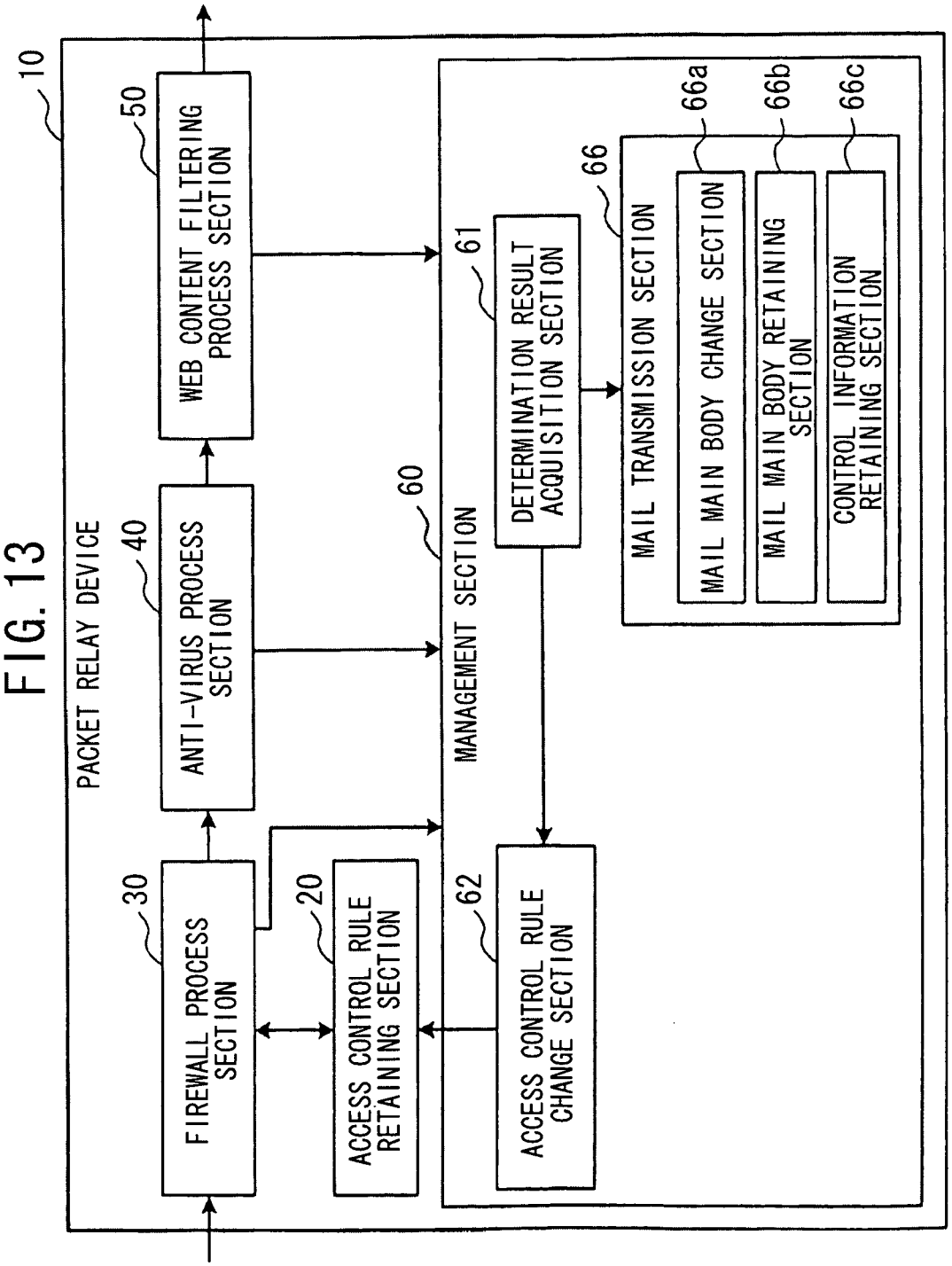
FIG. 13 is a block diagram showing an exemplary configuration of a packet relay device.

Referring to FIG. 13, an exemplary configuration of a packet relay device will be described.

As shown in FIG. 13, the packet relay device 10 includes, an access control rule retaining section 20, a firewall process section 30, an anti-virus process section 40, a Web content filtering process section 50, and a management section 60. On the other hand, the management section 60 internally includes a mail transmission section 66, and the mail transmission section 66 internally includes a mail main body change section 66a, a mail main body retaining section 66b, and a control information retaining section 66c. It should be noted that the description of the elements, which perform process operations and functions similar to those shown in FIG. 1, will be omitted. Hereinafter, in particular, a determination result acquisition section 61, the mail transmission section 66, the mail main body change section 66a, the mail main body retaining section 66b and the control information retaining section 66c will be described.

FIG. 14 is a diagram showing an example of information stored in the mail main body retaining section. When the relay of a packet is denied, the mail main body retaining section 66b retains information for notifying a manager or the like of the denial of the packet relay along with a security problem of the packet. As shown in FIG. 14, the mail main body retaining section 66b retains, in association with a mail main body to be transmitted to a predetermined transmission destination, and determination source identification information for uniquely identifying the process section that has determined whether or not to permit the relay of a packet. For example, as shown in FIG. 14, the mail main body retaining section 66b retains determination source identification information "AV" in association with a mail main body "B" that means "access is denied because a virus is detected". The content of a mail main body is desirably associated with a determination source that has determined whether or not to permit the relay.

FIG. 15 is a diagram showing an example of information stored in the control information retaining section. The control information retaining section 66c retains information used by the mail main body change section 66a. Specifically, as shown in FIG. 15, the control information retaining section 66c stores a transmission source address, a transmission destination address, a protocol, and determination source identification information in association with each other. For example, as shown in FIG. 15, the control information retaining section 66c stores a transmission source address "4. 4. 4. 4", a transmission destination address "5. 5. 5. 5", a protocol "HTTP", and determination source identification information "AV" in association with each other.

Upon receiving the determination result information "rejected" along with the transmission source address, transmission destination address and protocol of a packet, the relay of which is determined to be rejected, from the firewall process section 30, the anti-virus process section 40 or the Web content filtering process section 50, the determination result acquisition section 61 outputs the received transmission source address, transmission destination address and protocol to the mail transmission section 66, and identifies the process section serving as a reception source to also output determination source identification information thereto.

When there is a packet the relay of which is denied based on a determination result acquired by the determination result acquisition section 61, the mail transmission section 66 transmits a mail, indicative of which one of the process sections has executed the denial of the relay of communication data, to a predetermined transmission destination.

Specifically, upon receipt of the transmission source address, transmission destination address and protocol of a packet the relay of which is rejected, and determination source identification information from the determination result acquisition section 61, the mail transmission section 66 makes reference to the mail main body retaining section 66b, and reads a mail main body associated with the received determination source identification information. Then, the mail transmission section 66 transmits a mail to a predetermined transmission destination based on the read mail main body. It should be noted that when the determination source identification information received from the determination result acquisition section 61 is "AV" or "CF", the mail transmission section 66 associates the transmission source address, transmission destination address, protocol, and the determination source identification information with each other, and stores the resultant association in the control information retaining section 66c. It should also be noted that the determination source identification information "AV" or "CF" means that a change is made to the access control rule retaining section 20 by the access control rule change section 62.

Now, a process performed by the mail main body change section 66a of the mail transmission section 66 will be described. Even if the relay of a packet is denied by the process of the firewall process section 30, which is different from the original anti-virus process section 40 or Web content filtering process section 50, based on a rule changed by the access control rule change section 62 and retained in the access control rule retaining section 20, the mail main body change section 66a changes a mail main body so as to indicate that the relay of the packet is denied by the execution of the process of the original process section.

Specifically, upon receipt of the transmission source address, transmission destination address and protocol of a packet, the relay of which is determined to be rejected, and determination source identification information "FW" from the determination result acquisition section 61, the mail main body change section 66a makes reference to the control information retaining section 66c, and searches for the association of the received transmission source address, transmission destination address and protocol. Then, when the association of the received transmission source address, transmission destination address and protocol is recorded in the control information retaining section 66c, the mail main body change section 66a reads determination source identification information associated with this association. Then, the mail main body change section 66a makes reference to the mail main body retaining section 66b to read a mail main body associated with the read determination source identification information, and thereafter transmits a mail to a predetermined transmission destination based on the read mail main body.

As described above, when there is a packet the relay of which is denied, the packet relay device shown in FIG. 13 transmits, based on a determination result, a mail, indicating which one of the process sections among the firewall process section, the anti-virus process section and the Web content filtering process section has executed the denial of the relay, to a predetermined transmission destination. Further, even if the packet relay is denied by the execution of the process of the firewall process section 30 different from the original process section, the packet relay device transmits a mail main body indicating that the packet relay is denied by the execution of the process of the process section which should originally determine the rejection of the packet relay. Thus, a mail indicating that the relay of a packet is denied by the execution of the process of the original process section can be notified to a manager or the like even if a change is made to the access control rule retaining section and the relay of the packet is denied due to the determination of relay rejection of this packet by the firewall process section different from the process section that has determined the relay rejection of the packet.

Although the examples of the packet relay device have been described thus far, various embodiments other than the above-described examples may be applied to the packet relay device. Other examples (1) to (4) will be respectively described as shown below.

(1) Security Function

The above-described examples have each been described by taking an example in which firewall, anti-virus and Web content filtering functions serve as the first to third security functions, respectively. However, the present invention is not limited to such an example; alternatively, a security function to be applied may be any of the security functions as long as relay permission/rejection is determined based on a predetermined rule when it is executed by the packet relay device. Furthermore, in accordance with this, the order of execution of the firewall, anti-virus and Web content filtering functions may be changed.

(2) Rule Change

The above-described examples have been described based on a case where a change is made to the access control rule retaining section to which the firewall process section, serving as the most forwardly located security function, makes reference. However, the present invention is not limited to such an example. Alternatively, a rule defined for a security function located forward of a security function that has determined relay rejection may be changed. For example, when relay rejection is determined by executing the process of the Web content filtering process section on a packet, a change may be made to a predetermined rule defined for the anti-virus process section, and relay rejection may be determined by executing the process of the anti-virus process section on a packet transmitted from the same transmission source next time. Also in this case, the effect of reducing the load applied to the packet relay device is sufficiently obtained.

(3) Rule Change Condition

The above-described examples have been described based on a case where a change is made to the access control rule retaining section on the conditions that the number of times the relay rejection is determined is calculated based on accumulated determination results and the calculated number of times becomes equal to or greater than a predetermined value. However, the present invention is not limited to such an example. Alternatively, a change may be made to the access control rule retaining section under a predetermined condition. For example, a change may be made to the access control rule retaining section on the condition that the time at which relay rejection is determined falls within a predetermined time period.

(4) System Configuration and So Forth

Furthermore, respective constituting elements of each device shown in the drawings are provided based on functional concepts, and they do not necessarily have to be physically configured as shown in the drawings. In other words, a specific embodiment of distribution/integration of each device is not limited to one shown in the drawings; for example, the determination result acquisition section 61 and the access control rule change section 62 may be integrated. That is, the entire system thereof or a part of the system thereof may be configured by functional or physical distribution/integration in any unit in accordance with various loads, use situation and the like. Moreover, the entire or any part of each process function, performed in each device, may be implemented by a CPU and a program analyzed and executed by the CPU, or may be implemented as hardware using wired logic.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory recording medium for storing a management program executed by a computer serving as a data relay device that is capable of executing a plurality of security functions in combination, the data relay device sequentially executing the plurality of security functions on inputted communication data based on a predetermined rule defined for each of the plurality of security functions to determine whether or not to permit the relay of the communication data, and denying, without executing unexecuted subsequent security functions, the relay of the communication data if the relay is determined to be rejected, the management program managing operations of the plurality of security functions, the management program when executed by the computer causes the computer to perform a method comprising:

determining a transmission source of the inputted communication data;

acquiring a determination result indicating relay permission or rejection of the inputted communication data for each of the sequential security functions;

rejecting relay of the inputted communication data when any of the acquired determination results indicate rejection of the inputted communication data; and when relay of the inputted communication data has been rejected based on the acquired determination result from a second or subsequent security function, changing a rule defined for one or more of the security functions located upstream of the security function that has determined relay rejection to the rule defined for the security function that has determined relay rejection with respect to subsequent communication data transmitted by the transmission source.

2. The management program stored in the non-transitory recording medium according to claim 1, wherein, if there exists communication data the relay of which is decided by execution of all the security functions, the management program further comprises allowing, at the time when a predetermined security function is executed on the communication data, the computer to execute a process for changing a rule of the predetermined security function so that the relay of the communication data is decided without executing subsequent security functions.

3. The management program stored in the non-transitory recording medium according to claim 1, wherein the management program causes the computer to further perform:

accumulating a determination result indicating relay permission or rejection of the communication data; and when the accumulated determination result satisfies a predetermined condition, approving a change of a rule defined for the security function.

4. The management program stored in the non-transitory recording medium according to claim 1, wherein the management program causes the computer to further perform:

setting, when a rule of the security function is changed, an effective period for the changed rule; and canceling the rule change when the effective period has elapsed.

5. The management program stored in the non-transitory recording medium according to claim 1, wherein the management program causes the computer to further perform:

setting, when a rule of the security function is changed, a time condition for application of the changed rule; and controlling permission or rejection of the application of the changed rule.

6. The management program stored in the non-transitory recording medium according to claim 1, wherein the management program causes the computer to further perform:

transmitting, when there exists communication data the relay of which is denied based on the acquired relay permission or rejection determination result, a relay denial notification, indicative of which one of the security functions has executed the denial of relay of the communication data, to a predetermined transmission destination; and allowing, even if the relay of the communication data is denied by execution of the security function different from the original security function based on a changed security function rule, the computer to execute a process for changing the relay denial notification so as to indicate that the relay of the communication data is denied by execution of the original security function.

7. A data relay device that has a plurality of security functions, the data relay device sequentially executing security functions on inputted data based on a predetermined rule defined for each of the security functions, to determine whether or not to permit the relay of the data, and denying the relay of if the data the relay is determined to be rejected, the data relay device comprising:

a determination unit that determines a transmission source of the inputted data;

a determination result acquisition unit that acquires a determination result indicating permission or rejection of a relay of the inputted data for each of the sequential security functions;

a rejection unit that reject relay of the inputted data when any of the acquired determination results indicate rejection of the inputted data; and a rule change unit that changes, when relay of the inputted data has been rejected based on the acquired determination result from a second or subsequent security function, a rule defined for one or more of the security functions located upstream of the security function that has determined relay rejection to the rule defined for the security function that has determined relay rejection with respect to subsequent data transmitted by the transmission source.

8. A data relay method for a data relay device that is capable of executing a plurality of security functions in combination, the data relay device sequentially executing the plurality of security functions on inputted communication data based on a predetermined rule defined for each of the plurality of security functions to determine whether or not to permit the relay of the communication data, and denying, without executing unexecuted subsequent security functions, the relay of the communication data if the relay is determined to be rejected, wherein the data relay method comprises:

acquiring a determination result indicating relay permission or rejection of the communication data; and changing, based on the acquired determination result indicating permission or rejection of the communication data, a rule defined for any of the security functions located forward of the security function that has determined relay rejection, so that the relay of the communication data is determined to be rejected.

* * * * *

UNITED STATES PATENT AND TRADEMARK OFFICE
CERTIFICATE OF CORRECTION

| | | |
|---|---|---|
| PATENT NO. | : 8,151,340 B2 | Page 1 of 1 |
| APPLICATION NO. | : 12/230536 | |
| DATED | : April 3, 2012 | |
| INVENTOR(S) | : Tomohito Nakata | |

It is certified that error appears in the above-identified patent and that said Letters Patent is hereby corrected as shown below:

Title Page, item (57) (Abstract), Column 2, Line 4, Delete "of the data the" and insert -- of the data if the --, therefor.

Column 18, Line 48, In Claim 7, delete "of if the data the" and insert -- of the data if the --, therefor.

Signed and Sealed this
Nineteenth Day of June, 2012

David J. Kappos
*Director of the United States Patent and Trademark Office*